INVENTOR
HOWARD L. HALBACH.
BY Bradley & Bee
ATTORNEYS

Patented Apr. 30, 1935

1,999,591

UNITED STATES PATENT OFFICE 1,999,591

PROCESS AND APPARATUS FOR DRAWING SHEET GLASS

Howard L. Halbach, Clarksburg, W. Va., assignor to Pittsburgh Plate Glass Company, a corporation of Pennsylvania Application December 22, 1932, Serial No. 648,455

7 Claims. (Cl. 49—17)

Figure 1:
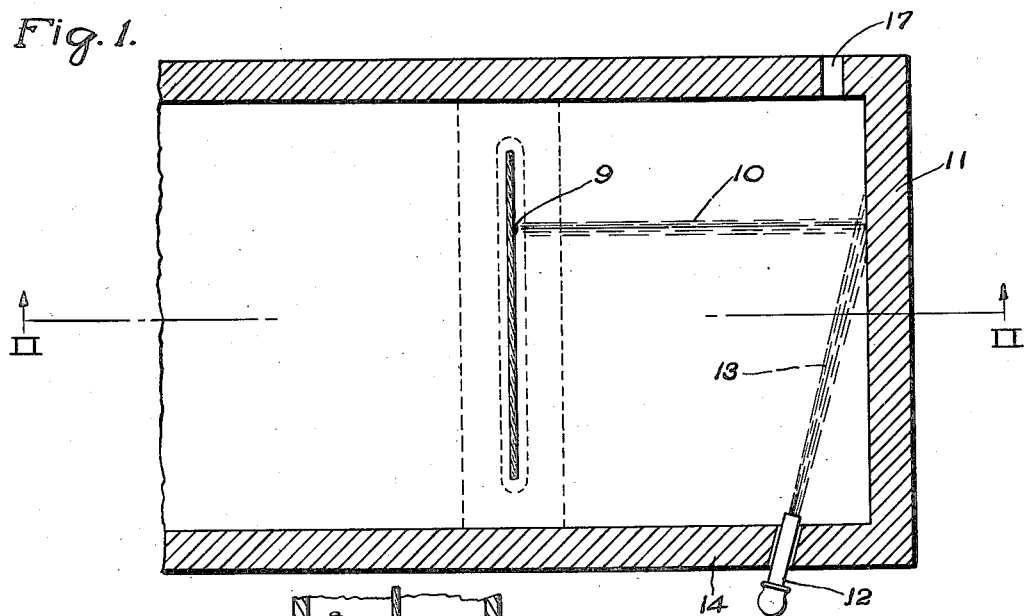
Figure 2:
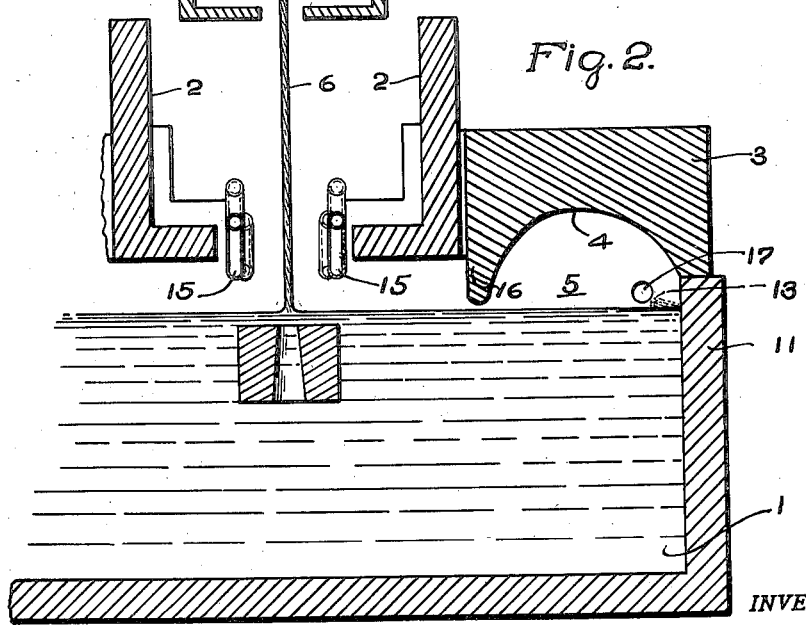

The invention relates to a process for drawing sheet glass from a molten bath, and has for its primary object the provision of a process and apparatus whereby certain lines which appear in the sheet, as it is drawn vertically from the bath are eliminated. The preferred means for accomplishing the desired result are shown in the accompanying drawing, wherein:

Figure 1 is a horizontal section taken through a drawing kiln, or tank and Fig. 2 is a vertical section on the line II—II of Fig. 1.

Referring to the drawing, 1 is a drawing tank or kiln, which communicates at its left hand end with a melting tank of any desired type (not shown). The top of this tank is covered by refractory blocks or slabs including the L-shaped members 2, and the slab 3 located at the end of the tank and having the recessed lower face 4 to provide a combustion chamber 5 for the purpose hereinafter described. The glass sheet 6 is drawn upward into the annealing leer 7 provided with the usual drawing rolls 8, 8 which grip the sheet between them and pull it upward in a continuous sheet or ribbon, this being a procedure well known in the art. A pair of water coolers 15, 15 are employed on either side of the sheet to chill the glass and permit increased speed of drawing, this feature of construction also being well known in the art.

In the operation of this apparatus, it often happens that a line appears in the glass sheet, and persists for long periods, such line being parallel to the side edges of the sheet, and being due to a slight thickening of the sheet. In Fig. 1, the location of the lower end of a line of this kind is shown by a dot marked 9. An indication of the origin of this line is found on the surface of the glass by the dark zone 10 which extends from the sheet to the end wall 11 of the kiln. Temperature measurements along the zone 10 at the surface of the glass show that the glass in this zone has a somewhat lower temperature than the surface glass in the bath on each side of the zone, and it is this cooler glass which causes the slight thickening in the sheet from the point 9 upward, and gives the appearance of a line running longitudinally of the sheet. This cooler zone or area 10 is believed to be due to convection currents in the glass which meet along such zone.

The present invention provides a means for eliminating the line whenever it appears and for preventing the formation of such lines, and in its preferred form involves the use of the gas burner 12 which projects through the side wall of the tank just above the surface of the glass, and which is so directed that the flame 13 impinges on the surface of the glass and the wall 11 of the kiln at the point at which the zone 10 starts, about as indicated in Fig. 1. When this additional heat is applied, the zone 10 will soon begin to shift laterally, either in one direction or the other, until it reaches the edge of the sheet and disappears, such shifting movement ordinarily being toward the wall 14 through which the burner 12 is inserted. After a line has been eliminated from the sheet, the drawing may ordinarily be continued for a long period (without further use of the burner 12) before another zone of cooler glass appears and causes another line, and in fact no further lines will appear if the burner is kept on.

The use of the combustion chamber 5 is necessary due to the use of the burner 12, as without such chamber, a certain amount of condensation occurs in the space above the bath between the water cooler 15 and the wall 11 from the contact of the hot gases with the cooler. This causes dirt to fall onto the surface of the glass, impairing its quality. The provision of the chamber 5 with the lip 16 on the side toward the cooler confines the gases of combustion (to a large extent) to the combustion chamber and avoids this difficulty. Provision is made for the escape of the gases of combustion by the opening 17 through the wall of the tank.

What I claim is:

1. A method of removing a line from a glass sheet drawn continuously from a kiln, which consists in directing a heating flame against the surface of the glass at the end wall of the tank at the point at which the zone of cooler glass, which causes the line, starts, continuing the application of said flame until the line disappears, and then discontinuing the application of the flame.

2. A method of removing a line from a glass sheet drawn continuously from a kiln, which consists in directing a heating flame against the end wall of the tank at and above the surface of the glass at the point at which the zone of cooler glass, which causes the line, starts, continuing the application of said flame until the line disappears, and then discontinuing the application of the flame.

3. A method of removing a line from a glass sheet drawn continuously from a kiln, which consists in directing a heating flame against the end wall of the kiln and the surface of the glass at the point at which the zone of cooler glass, which causes the line, starts, continuing the application of said flame until the line disappears, and then discontinuing the application of the flame.

4. A method of removing a line from a glass sheet drawn continuously from a kiln, which consists in directing a heating flame against the surface of the glass at the end wall of the tank at the point at which the zone of cooler glass, which causes the line, starts, and continuing the application of such flame until the zone moves to the edge of the bath causing the line to disappear from the sheet, and then discontinuing the application of said flame.

5. A method of removing a line from a glass sheet drawn continuously from a kiln, which consists in directing a heating flame from the side of the tank over the surface of the glass and causing it to impinge against the back wall of the kiln at the point where the zone of cooler glass, which causes the line, starts, continuing the application of said flame until the line disappears, and then discontinuing the application of the flame.

6. In combination with a glass drawing kiln having a top and a drawing opening intermediate the ends of the tank, a gas burner extending through the side wall of the kiln above the surface of the glass and directed across the bath and toward the end wall of the tank, so that the flame will impinge on said wall at the surface of the glass.

7. In combination with a glass drawing kiln having a top and a drawing opening intermediate the ends of the tank, a gas burner extending through the side wall of the kiln above the surface of the glass and directed across the bath and along the end wall of the tank, so that the flame will impinge on the surface of the glass adjacent said wall, and a combustion chamber formed in the top of the kiln at its forward end having a lip projecting into proximity to the surface of the glass.

HOWARD L. HALBACH.